US012777508B2

(12) United States Patent
Liu et al.

(10) Patent No.: US 12,777,508 B2
(45) Date of Patent: Oct. 27, 2026

(54) UE CAPABILITY REPORT ON PANEL AND BEAM SWITCHING

(71) Applicant: LENOVO (BEIJING) LIMITED, Beijing (CN)

(72) Inventors: Bingchao Liu, Beijing (CN); Alexander Johann Maria Golitschek Edler Von Elbwart, Darmstadt (DE); Ankit Bhamri, Roedermark (DE)

(73) Assignee: LENOVO (BEIJING) LIMITED, Beijing (CN)

( * ) Notice: Subject to any disclaimer, the term of this patent is extended or adjusted under 35 U.S.C. 154(b) by 304 days.

(21) Appl. No.: 18/686,269

(22) PCT Filed: Aug. 27, 2021

(86) PCT No.: PCT/CN2021/114960

§ 371 (c)(1),
(2) Date: Feb. 23, 2024

(87) PCT Pub. No.: WO2023/024062

PCT Pub. Date: Mar. 2, 2023

(65) Prior Publication Data

US 2024/0365356 A1 Oct. 31, 2024

(51) Int. Cl.
*H04W 72/51* (2023.01)
*H04L 27/26* (2006.01)
(Continued)

(52) U.S. Cl.
CPC ....... *H04W 72/51* (2023.01); *H04L 27/26025* (2021.01); *H04L 27/2605* (2013.01); *H04W 72/046* (2013.01); *H04W 72/1273* (2013.01)

(58) Field of Classification Search
CPC ............... H04W 72/51; H04W 72/046; H04W 72/1273; H04L 27/26025; H04L 27/2605;
(Continued)

(56) References Cited

U.S. PATENT DOCUMENTS

2020/0169995 A1* 5/2020 Nam .................. H04W 72/044
2020/0351673 A1* 11/2020 Bai ...................... H04B 7/0691
(Continued)

FOREIGN PATENT DOCUMENTS

CN 110169101 A 8/2019
CN 110537334 A 12/2019
(Continued)

OTHER PUBLICATIONS

International Search Report and Written Opinion dated May 30, 2022 for international Application No. PCT/CN2021/114960.
(Continued)

*Primary Examiner* — Afshawn M Towfighi
(74) *Attorney, Agent, or Firm* — AMPACC Law Group, PLLC

(57) ABSTRACT

Methods and apparatuses for UE capability report on panel and beam switching are disclosed. A method at an UE comprises transmitting at least one of a capability on DL panel activation, a capability on UL panel activation, a capability on DL panel switching, a capability on UL panel switching, a capability on DL beam switching, and a capability on UL beam switching; and determining, when a new beam for DL reception or UL transmission is indicated, when the new beam is applied for DL reception or UL transmission according to at least one of the capabilities.

19 Claims, 2 Drawing Sheets

(51) Int. Cl.
*H04W 72/044* (2023.01)
*H04W 72/1273* (2023.01)

(58) Field of Classification Search
CPC ... H04L 5/0078; H04L 5/0096; H04L 5/0044; H04L 5/0048; H04L 5/0053; H04L 5/14; H04L 5/0023
See application file for complete search history.

(56) References Cited

U.S. PATENT DOCUMENTS

| | | | | |
|---|---|---|---|---|
| 2021/0112540 | A1* | 4/2021 | Zewail | H04B 7/06952 |
| 2021/0153215 | A1* | 5/2021 | Guan | H04L 67/34 |
| 2021/0258811 | A1* | 8/2021 | Zhang | H04B 7/0404 |
| 2022/0150851 | A1* | 5/2022 | Tian | H04L 5/0051 |
| 2022/0167332 | A1* | 5/2022 | Li | H04B 7/0408 |
| 2022/0224465 | A1* | 7/2022 | Li | H04L 1/1671 |
| 2023/0107768 | A1* | 4/2023 | Chen | H04B 7/0404 455/68 |
| 2024/0365356 | A1* | 10/2024 | Liu | H04L 5/0023 |

FOREIGN PATENT DOCUMENTS

| | | | | |
|---|---|---|---|---|
| CN | 113169781 | A | 7/2021 | |
| EP | 3958600 | A1 * | 2/2022 | H04B 7/0691 |
| WO | 2020226809 | A1 | 11/2020 | |

OTHER PUBLICATIONS

Moderator (Interdigit AL, Inc.) "FL Summary for Beam Management for new SCSs", 3GPP TSG RAN WG1 #104b-e R1-2103821; Apr. 20, 2021; 47 pages.

* cited by examiner

UE CAPABILITY REPORT ON PANEL AND BEAM SWITCHING

CROSS REFERENCE TO RELATED APPLICATIONS

This application is a national phase entry of International Application No. PCT/CN2021/114960, filed on Aug. 27, 2021, which is incorporated by reference in its entirety.

FIELD

The subject matter disclosed herein generally relates to wireless communications, and more particularly relates to methods and apparatuses for UE capability report on panel and beam switching.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), sub-carrier space (SCS), Cyclic prefix (CP), frequency range 1 (FR1): corresponding to 450 MHz~6000 MHz, frequency range 2 (FR2): corresponding to 24.25 GHz~52.6 GHz, quasi co-location (QCL), Physical Downlink Control Channel (PDCCH), Physical Downlink Shared Channel (PDSCH), Physical Uplink Control Channel (PUCCH), Physical Uplink Shared Channel (PUSCH).

Beam based transmission is required to support high frequency band, especially for the band above 52.6 GHz (e.g. from 52.6 GHz to 71 GHz). Beam switching is usually expected even when a UE moves within a cell. OFDM with larger SCSs (sub-carrier spaces) (e.g., 480 kHz and 960 kHz) is adopted to support wideband operation in the frequency band above 52.6 GHz. 3GPP TR38.817 claims that a time gap that is equal to or smaller than 100 ns is required for beam switching. The time gap that is equal to or smaller than 100 ns can be neglected in FR1 or FR2 operation with SCS<480 kHz (e.g., SCS=15 kHz, 30 kHz, 60 kHz or 120 kHz), since such time gap can be covered by the CP length for SCS smaller than 480 kHz and accordingly shall not cause performance degradation, as pointed out in TR38.817.

On the other hand, as shown in Table 1, for SCS=960 kHz, the CP length of the first symbol for normal CP is 81.25 ns that is shorter than 100 ns. It means that the above-described time gap may not be covered by the CP length for SCS=960 KHz. Besides, larger SCS (e.g. SCS that is larger than 960 kHz) may be introduced for very higher frequency band (e.g., above 71 GHz or even terahertz), where the beam switching time cannot be neglected since the CP length of the very higher frequency band is too short. Considering different UE implementation complexities, the required beam switching time may be different for different UEs. So, it is beneficial that the UE could indicate its capability on the beam switching time at least for DL and UL scheduling.

TABLE 1

| | Normal CP | | |
|---|---|---|---|
| SCS | The 1$^{st}$ symbol | The other symbol | Extended CP |
| 480 kHz | 162.5 ns | 146.875 ns | 521.875 ns |
| 960 kHz | 81.25 ns | 73.4375 ns | 260.9375 ns |

Multiple panels are usually equipped by the UE to support FR2 operation. Each of the panels can be activated for DL reception or for UL transmission. The information on panel activation time is also useful for gNB scheduling. If more than one panel is activated, while only part of activated panels can be used for DL reception or UL transmission, the time duration for panel switching may also have impact on the scheduling, especially for multi-TRP operation.

This invention targets the report of the capability on panel activation and panel switching and beam switching as well as the corresponding gNB and UE behaviors.

BRIEF SUMMARY

Methods and apparatuses for UE capability report on panel and beam switching are disclosed.

In one embodiment, a method at an UE comprises transmitting at least one of a capability on DL panel activation, a capability on UL panel activation, a capability on DL panel switching, a capability on UL panel switching, a capability on DL beam switching, and a capability on UL beam switching; and determining, when a new beam for DL reception or UL transmission is indicated, when the new beam is applied for DL reception or UL transmission according to at least one of the capabilities.

In one embodiment, each of the capabilities may be a time duration. The time duration may be transmitted as one of the number of OFDM symbols, the number of fractional OFDM symbols, the number of CPs, and the number of fractional CPs, for each SCS. If the RX panel used for reception of PDCCH transmissions and/or PDSCH transmissions is changed and shall be applied from slot n, the UE expects a time gap that is no less than the time duration for DL panel switching between the last symbol of reception of the latest PDCCH or PDSCH transmission before slot n and the first symbol of reception of PDCCH or PDSCH transmission in slot n, and if the TX panel used for transmission of PUSCH and/or PUCCH transmissions is changed and shall be applied form slot n, the UE expects a time gap that is no less than the time duration for UL panel switching between the last symbol of transmission of the latest PUSCH transmission or PUCCH transmission before slot n and the first symbol of transmission of PUSCH transmission or PUCCH transmission in slot n.

In another embodiment, the capability on DL beam switching may be a capability on whether DL beam switching can be completed within a CP for different SCSs; and the capability on UL beam switching may be a capability on whether UL beam switching can be completed within a CP for different SCSs.

In some embodiment, if the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is configured or indicated between the last symbol of reception of the latest PDCCH or PDSCH transmission before slot n and the first symbol of reception of PDCCH or PDSCH transmission in slot n or the capability on DL beam switching indicates that DL beam switching can be completed within a CP for the SCS, applying the changed DL beam from slot n. If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is not configured or indicated between the last symbol of reception of the latest PDCCH or PDSCH transmission before slot n and the first symbol of reception of PDCCH or PDSCH transmission in slot n, or the capability on DL beam switching indicates that DL beam switching cannot be completed within a CP for the SCS, not applying the changed DL beam; or applying the changed DL beam from slot $n_{switch}$ that is later than slot n if the time gap that is no less than the time duration is configured prior to the slot $n_{switch}$, or applying the changed DL beam from reception of a first PDSCH or PDCCH transmission in slot n or after slot n. If the UL beam used for transmission of PUCCH and/or PUSCH transmissions is changed and shall be applied from slot n for a SCS of a serving cell, and if a time gap that is no less than a time duration indicated by the capability on UL beam switching for the SCS is configured or indicated between the last symbol of transmission of the latest PUCCH or PUSCH transmission before slot n and the first symbol of transmission of PDCCH or PDSCH transmission in slot n or the capability on UL beam switching indicates that UL beam switching can be completed within a CP for the SCS, applying the changed UL beam from slot n. If the UL beam used for transmission of PUCCH and/or PUSCH transmissions is changed and shall be applied from slot n for a SCS of a serving cell, and if a time gap that is no less than a time duration indicated by the capability on UL beam switching for the SCS is not configured or indicated between the last symbol of transmission of the latest PUCCH or PUSCH transmission before slot n and the first symbol of transmission of PUCCH or PUSCH transmission in slot n or the capability on UL beam switching indicates that UL beam switching cannot be completed within a CP for the SCS, not applying the changed UL beam; or applying the changed UL beam from slot $n_{switch}$ that is later than slot n if the time gap that is no less than the time duration for UL beam switching is configured prior to the slot $n_{switch}$; or applying the changed UL beam from transmission of a first PUSCH or PUCCH transmission in slot n or after slot n.

In some embodiment, the changed DL beam or the changed UL beam is a common beam. In some other embodiment, the changed DL beam for reception of PDSCH transmission(s) is indicated in a TCI field of a DCI scheduling the PDSCH transmission(s). In particular, the slot n is a slot in which the first scheduled PDSCH transmission that has a scheduling offset larger than timeDurationForQCL is transmitted when multiple PDSCH transmissions are scheduled by the DCI.

In one embodiment, a method at a base unit comprises receiving at least one of a capability on DL panel activation, a capability on UL panel activation, a capability on DL panel switching, a capability on UL panel switching, a capability on DL beam switching, and a capability on UL beam switching; and determining, when a new beam for DL reception or UL transmission is indicated, when the new beam is applied for DL reception or UL transmission according to at least one of the capabilities.

In another embodiment, a remote unit (UE) comprises a transmitter that transmits at least one of a capability on DL panel activation, a capability on UL panel activation, a capability on DL panel switching, a capability on UL panel switching, a capability on DL beam switching, and a capability on UL beam switching; and a processor that determines, when a new beam for DL reception or UL transmission is indicated, when the new beam is applied for DL reception or UL transmission according to at least one of the capabilities.

In yet another embodiment, a base unit comprises a receiver that receives at least one of a capability on DL panel activation, a capability on UL panel activation, a capability on DL panel switching, a capability on UL panel switching, a capability on DL beam switching, and a capability on UL beam switching; and a processor that determines, when a new beam for DL reception or UL transmission is indicated, when the new beam is applied for DL reception or UL transmission according to at least one of the capabilities.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
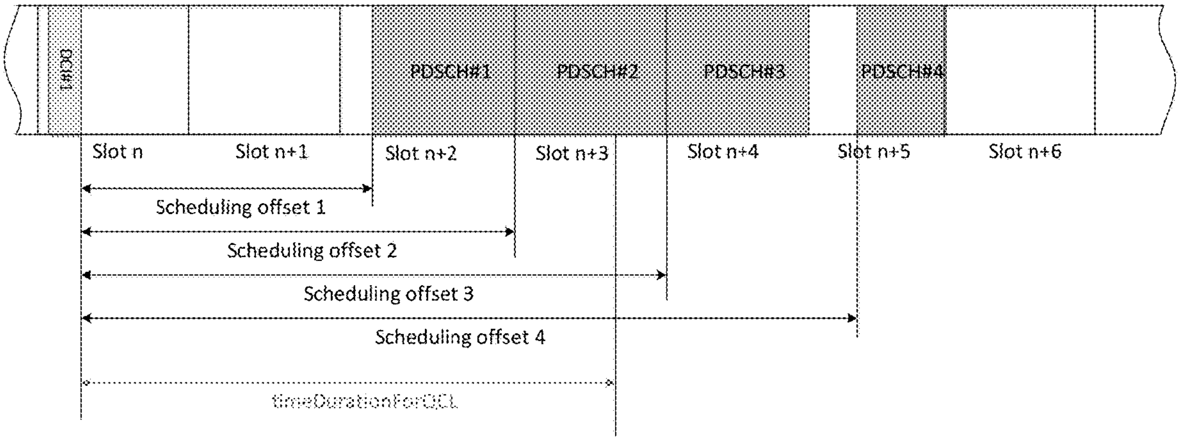
FIG. 1 illustrates an example of a third embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Multiple panels are usually equipped by a UE to support higher frequency operation. Different panel architectures may be adopted by different UEs. For example, multiple panels can be equipped by a UE while only a part of the multiple panels are activated for DL reception or UL transmission. For another example, a typical UE implementation is that multiple panels are activated, and each of the activated panels can be used for DL reception while only one activated panel can be used for UL transmission.

Different panels have different RF chains. In addition, different panels have different antenna arrays. The time duration for panel activation (or panel deactivation), the time duration for panel switching and the time duration for beam switching within a panel may be different.

A first embodiment relates to the capabilities to be reported for panel activation, panel switching and beam switching.

(1) The Capability on Panel Activation:

The capability on panel activation can be a time duration for panel activation.

If one panel can only be used for DL reception, the time duration for the one panel switching from OFF status to ON status and being ready for DL reception can be referred to as capability on DL panel activation, e.g. a time duration for DL panel activation $$T_{DL}^{Panel,activation}.$$

If a panel can be used for both DL reception and UL transmission, the time duration for the panel switching from OFF status to ON status and being ready for DL reception can be referred to as capability on DL panel activation, e.g. the time duration for DL panel activation $$T_{DL}^{Panel,activation},$$

and the time duration for the panel switching from OFF status to ON status and being ready for UL transmission can be referred to as capability on UL panel activation, e.g. a time duration for UL panel activation $$T_{UL}^{Panel,activation}.$$

The time duration $$T_{DL}^{Panel,activation}$$

and the time duration $$T_{UL}^{Panel,activation}$$

may have different values.

(2) The Capability on Panel Switching:

The capability on panel switching can be a time duration for panel switching. Panel switching means a panel switching from an old panel to a new panel, or from the current used panel to another indicated new panel. It can be regarded as selecting a new panel. So, the capability on panel switching can be also referred to as the capability on panel selection.

$$T_{DL}^{Panel,switching}$$

indicates a time duration for switching panel for DL reception from one activated panel for DL reception to another activated panel for DL reception.

$$T_{UL}^{Panel,switching}$$

indicates a time duration for switching panel for UL transmission from one activated panel for UL transmission to another activated panel for UL transmission.

$$T_{DL}^{Panel,switching}$$

and $$T_{UL}^{Panel,switching}$$

may have different values.

(3) The Capability on Beam Switching:

The capability on beam switching can be a time duration for beam switching. Beam switching means a beam switching from an old beam (e.g. a default beam) to a new beam, or from the current used beam to another indicated new beam.

$$T_{DL}^{Beam}$$

indicates a time duration used for the UE to switch from the current DL RX beam (i.e. current RX beam for DL reception) to another DL RX beam.

$$T_{UL}^{Beam}$$

indicates a time duration used for the UE to switch from the current UL TX beam (i.e. current TX beam for UL transmission) to another UL TX beam.

$$T_{DL}^{Beam}$$

and $$T_{UL}^{Beam}$$

may have different values.

In NR Release 16, the beam used for reception of PDSCH transmissions is indicated by the TCI field contained in the DCI scheduling the PDSCH transmissions. In NR Release 17, the new beam used for DL reception or for UL transmission can be an indicated common beam that applies to reception of all PDSCH and PDCCH transmissions and transmission of all PUSCH and PUCCH transmissions. The DL beam or the common beam is indicated by the indicated TCI state.

Each TCI state contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type 2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In NR Release 17, the DL common beam and the UL common beam are determined by the QCL-TypeD RS in the indicated TCI state. In NR Release 16, the DL beam for PDSCH reception is determined by the QCL-TypeD RS contained in the indicate TCI state.

Each of the time duration for DL beam switching $$T_{DL}^{Beam}$$

and the time duration for UL beam switching $$T_{UL}^{Beam}$$

is typically less than 100 ns, which can be covered by a CP for SCS <=480 kHz as illustrated in Table 2.

TABLE 2

| SCS [kHz] | CP length |
|---|---|
| 15 | 4.69 µs |
| 30 | 2.34 µs |
| 60 | 1.17 µs |
| 120 | 586 ns |
| 240 | 293 ns |
| 480 | 146.875 ns |
| 960 | 73.4375 ns |

On the other hand, since the CP length for SCS=960 kHz is 73.4 ns (which is less than 100 ns), the beam switching may not be able to be completed within such CP length for a UE with lower capability (e.g., the beam switching time for the UE is larger than 73.4 ns), while the beam switching may be able to be completed within such CP length for a UE with higher capability (e.g., the beam switching time for the UE is less than 73.4 ns).

In view of the above, the capability on beam switching can alternatively be a capability on whether beam switching can be completed within the CP for a difference SCS. For example, the UE may indicate whether the DL or UL beam switching can be completed within the CP for SCS-960 kHz and for SCS greater than 960 kHz (such as 1920 kHz). When the UE indicates (or reports) that the DL or UL beam switching cannot be completed within the CP for an SCS, it means that a gap (e.g. with a length of one symbol) is required by the UE to perform the DL or UL beam switching for the SCS.

A second embodiment relates to how the above-described capabilities are reported by the UE.

As described above, each of the capability on DL panel activation, the capability on UL panel activation, the capability on DL panel switching, the capability on UL panel switching, the capability on DL beam switching, and the capability on UL beam switching can be indicated by a time duration (i.e. time duration for DL panel activation $$T_{DL}^{Panel,activation},$$

time duration for UL panel activation $$T_{UL}^{Panel,activation},$$

time duration for DL panel switching $$T_{UL}^{Panel,switching},$$

time duration for UL panel switching $$T_{UL}^{Panel,switching},$$

time duration for DL beam switching $$T_{TD}^{Beam},$$

and time duration for UL beam switching $$T_{UL}^{Beam}).$$

A first sub-embodiment of the second embodiment relates how the time duration(s) are reported by the UE.

Different time durations (time duration for (DL and UL) beam switching, time duration for (DL and UL) panel switching, and time duration for (DL and UL) panel activation) have different orders of magnitude. For example, several milliseconds may be required for panel activation, while the time duration for beam switching is less than 100 ns. In view of the above, different time durations can be reported by different quantization schemes.

According to the first sub-embodiment of the second embodiment, the time duration can be reported as the number of a unit. For example, the unit can be one symbol, a fractional symbol (e.g. ½ symbol), one CP, or a fractional CP (e.g. ½ CP). In other words, the time duration can be reported by the number of symbols, or the number of fractional symbols (e.g. the number of ½ symbols), or the number of CPs, or the number of fractional CPs (e.g. the number ½ CPs).

Take the time duration for panel switching as an example.

The time duration for DL panel switching DurationForPanelSwitchingDL $$\left(T_{DL,i}^{Panel,switching}\right)$$

is defined as the number of symbols, between the last symbol of reception of a PDSCH transmission or PDCCH transmission by using a first activated panel for DL reception and the first symbol of reception of a PDSCH transmission or PDCCH transmission by using a second activated panel for DL reception, where i is the index of SCS. For example, i=1, 2, 3, 4, 5, 6, . . . corresponding to SCS of 60 kHz, 120 kHz, 240 kHz, 480 kHz, 960 kHz, 1920 kHz, . . . . It means that, for different SCSs, the $$T_{DL,i}^{Panel,switching}$$

may have different values (e.g. different number of symbols).

Similarly, the time duration for UL panel switching DurationForPanelSwitchingUL $$\left(T_{UL,i}^{Panel,switching}\right)$$

may be defined as the number of symbols, between the last symbol of transmission of a PUSCH transmission or PUCCH transmission by using a first activated panel for UL transmission and the first symbol of transmission of a PUSCH transmission or PUCCH transmission by using a second activated panel for UL transmission, where i is the index of SCS. For example, i=1, 2, 3, 4, 5, 6, . . . corresponding to SCS of 60 kHz, Panel, switching may 120 kHz, 240 kHz, 480 kHz, 960 kHz, 1920 kHz, . . . . For different SCSs, the $$T_{UL,i}^{Panel,switching}$$

may have different values (e.g. different number of symbols).

$$T_{DL,i}^{Panel,switching}$$

and $$T_{UL,i}^{Panel,switching}$$

may be reported as 0, 1, 2, . . . .

It can be seen that the time duration for DL or UL panel switching may be reported as 0. For example, the time duration for DL panel switching may be zero if all activated panels can be used for DL reception and all activated panels are always ready for DL reception.

Take the time duration for beam switching as another example.

The time duration for DL beam switching DurationForBeamSwitchingDL $$\left(T_{DL,i}^{Beam}\right)$$

is defined as the number of (CP/N) s, between the last symbol of reception of a PDSCH transmission or PDCCH transmission by using a first beam for DL reception and the first symbol of reception of a PDSCH transmission or PDCCH transmission by using a second beam for DL reception, where i is the index of SCS. For example, i=1, 2, 3, 4, 5, . . . corresponding to SCS of 60 kHz, 120 kHz, 240 kHz, 480 kHz, 960 kHz, . . . N is an integer equal to or larger than 1 and can be chosen to achieve a desired granularity for the unit of fractional CP. For example, N is 2 if the reported time duration is in unit of CP/2 for a certain SCS. Incidentally, if N is 1, the time duration is reported by the number of CPs.

Similarly, the time duration for UL beam switching DurationForBeamSwitchingUL $$\left(T_{UL,i}^{Beam}\right)$$

is defined as the number of (CP/N)s, between the last symbol of transmission of a PUSCH transmission or PUCCH transmission by using a first beam for UL transmission and the first symbol of transmission of a PUSCH transmission or PUCCH transmission by using a second beam for UL transmission, where i is the index of SCS For example, i=1, 2, 3, 4, 5, . . . corresponding to SCS of 60 kHz, 120 kHz, 240 kHz, 480 kHz, 960 kHz, . . . N is an integer equal to or larger than 1 and can be chosen to achieve a desired granularity for the unit of fractional CP. For example, N is 2 if the reported time duration is in unit of CP/2 for a certain SCS. Incidentally, if N is 1, the time duration is reported by the number of CPs.

$$T_{DL,i}^{Beam} \text{ and } T_{UL,i}^{Beam}$$

may be reported as 0, 1, 2, . . . .

It can be seen that the time duration for DL or UL beam switching may be reported as 0. For example, if a UE reports a capability to support simultaneous RX with different QCL-TypeD, two DL beams (which are usually formed from two different panels) are always ready for DL reception.

Each of the capability on DL beam switching, and the capability on UL beam switching can alternatively be a capability on whether beam switching can be completed within the CP for a difference SCS.

According to a second sub-embodiment of the second embodiment, the capability on whether beam switching can be completed within the CP for a difference SCS can be reported by a one-bit indication. For example, '0' means that beam switching cannot be completed within the CP for a SCS; while '1' means that beam switching can be completed within the CP for a SCS.

A third embodiment relates to gNB and UE behaviors during panel switching and beam switching in different capabilities.

For panel switching, the UE behaviors are described as follows:

If the RX panel used for reception of PDCCH transmissions and/or PDSCH transmissions is changed and shall be applied from slot n, the UE expects a time gap between the last symbol of reception of the latest PDCCH transmission and/or PDSCH transmission before slot n and the first symbol of reception of PDCCH transmission and/or PDSCH transmission in slot n that is no less than the reported $$T_{DL,i}^{Panel,switching}$$

(time duration for DL panel switching). From the gNB point of view, the gNB shall configure or indicate a time gap that is no less than the reported time duration for DL panel switching between the last symbol of reception of the latest PDCCH transmission and/or PDSCH transmission before slot n and the first symbol of reception of PDCCH transmission and/or PDSCH transmission in slot n. The UE shall not transmit data or signal to gNB nor receive data or signal from gNB during the time gap.

If the TX panel used for transmission of PUSCH transmissions and/or PUCCH transmissions is changed and shall be applied form slot n, the UE expects a time gap between the last symbol of transmission of the latest PUSCH and/or PUCCH transmission before slot n and the first symbol of transmission of PUSCH and/or PUCCH transmission in slot n that is no less than the reported $$T_{UL,i}^{Panel,switching}$$

(time duration for UL panel switching). From the gNB point of view, the gNB shall configure or indicate a time gap that is no less than the reported time duration for UL panel switching between the last symbol of transmission of the latest PUSCH transmission and/or PUCCH transmission before slot n and the first symbol of transmission of PUSCH transmissions and/or PUCCH transmission in slot n. The UE shall not transmit data or signal to gNB nor receive data or signal from gNB during the time gap.

For beam switching, the UE behaviors are described as follows:

(1) The new DL beam is a common beam applied to reception of PDCCH transmissions and/or PDSCH transmissions.

The DL beam is changed to a new common beam applied to reception of PDCCH transmissions and/or PDSCH transmissions and shall be applied from slot n. Depending on different capabilities on DL beam switching reported by the UE, different behaviors are proposed.

If the reported $$T_{DL,i}^{Beam,}$$

(time duration for DL beam switching) is less than or equal to the CP corresponding to the SCS of the serving cell or the UE reported that the DL beam switching can be completed within the CP for the SCS of the serving cell, the new common beam applies from slot n.

If the reported $$T_{DL,i}^{Beam,}$$

(time duration for DL beam switching) is larger than the CP corresponding to the SCS of the serving cell or the UE reported that the DL beam switching cannot be completed within the CP for the SCS of the serving cell, the UE expects that a one symbol time gap between the last symbol of reception of the latest PDCCH or PDSCH transmission before slot n and the first symbol of reception of PDCCH or PDSCH transmission in slot n is reserved so that the new common beam can apply from slot n. A time gap being reserved (or configured or indicated) means that the gNB does not transmit any DL signals or schedule any UL signals in some continuous symbols within the time gap.

If the one symbol time gap is configured or indicated by the gNB before slot n (e.g. the last symbol of slot n−1), then the UE will apply the DL beam switching at slot n.

If the one symbol time gap is not configured or scheduled by the gNB before slot n, the UE may apply one of first, second, third, fourth and fifth implementations (behaviors 1-1 to 1-5), or alternatively be configured to apply one of the behaviors 1-1 to 1-5 as follows.

In the first implementation (behavior 1-1), the UE continues to use the old beam for reception of all PDSCH and PDCCH transmissions. That is, the UE shall not switch to the new common beam for DL reception.

In the second implementation (behavior 1-2), the UE is expected to apply the beam switching at a later slot $n_{switch}$ after slot n if the required gap (e.g. one symbol time gap) is configured or indicated by the gNB prior to $n_{switch}$. For example, if the required gap is configured in slot k (k>=n), then $n_{switch}$=k+1, i.e. the UE shall apply the new common beam for reception of PDSCH and/or PDCCH transmissions from the first slot (i.e. slot k+1 or slot $n_{switch}$) after slot k in which the required gap is configured. From another point of view, $n_{switch}$ is determined by looking for the next sufficiently long gap (e.g. one symbol time gap).

In the third implementation (behavior 1-3), the UE is allowed to create a PDCCH or PDSCH reception gap from the beginning of slot n (i.e. after completing reception of PDCCH or PDSCH transmission by using the old beam), that is sufficiently long (e.g. at least one symbol) to accommodate the time duration for DL beam switching. This may imply to not receive the first symbol of a PDCCH or PDSCH transmission by using the new common beam in slot n. The first symbol of the PDCCH or PDSCH transmission in slot n is used for DL beam switching.

In the fourth implementation (behavior 1-4), the UE is allowed to create a PDCCH or PDSCH reception gap before the end of slot n−1 that is sufficiently long (e.g. at least one symbol) to ensure that PDCCH transmission and/or PDSCH transmission can be received by using the new common beam at the beginning of slot n (i.e. from the first symbol of slot n). This may imply to not receive the last symbol of a PDCCH or PDSCH transmission by using the old beam in slot n−1. The last symbol of the PDCCH or PDSCH transmission in slot n−1 is used for DL beam switching.

In the fifth implementation (behavior 1-5), if there is no PDCCH transmission and/or PDSCH transmission scheduled to be received in slot n, the UE can perform the DL beam switching in slot n, and apply the new common beam for reception of PDSCH transmissions and PDCCH transmissions after slot n (e.g. from slot n+1).

(2) The new UL beam is a common beam applied to transmission of PUSCH and/or PUCCH transmissions.

The UL beam is changed to a new common beam applied to transmission of PUSCH and/or PUCCH transmissions and shall be applied from slot n. Depending on different capabilities on UL beam switching reported by the UE, different behaviors are proposed.

If the reported $$T_{UL,i}^{Beam}$$

(time duration for UL beam switching) is less than or equal to the CP corresponding to the SCS of the serving cell or the UE reported that the UL beam switching can be completed within the CP for the SCS of the serving cell, the new common beam applies from slot n.

If the reported $$T_{UL,i}^{Beam}$$

(time duration for UL beam switching) is larger than the CP corresponding to the SCS of the serving cell or the UE reported that the UL beam switching cannot be completed within the CP for the SCS of the serving cell, the UE expects that a one symbol time gap between the last symbol of transmission of the latest PUSCH transmission or PUCCH transmission before slot n and the first symbol of transmission of PUSCH transmission or PUCCH transmission in slot n is reserved so that the new common beam can apply from slot n.

If the one symbol time gap is configured or indicated by the gNB before slot n (e.g. the last symbol of slot n−1), then the UE will apply the UL beam switching at slot n.

If the one symbol time gap is not configured or scheduled by the gNB before slot n, the UE may apply one of first, second, third, fourth and fifth implementations (behaviors 2-1 to 2-5), or alternatively be configured to apply one of the behaviors 2-1 to 2-5 as follows.

In the first implementation (behavior 2-1), the UE continues to use the old beam for transmission of all PUSCH and PUCCH transmissions. That is, the UE shall not switch to the changed common beam for UL transmission.

In the second implementation (behavior 2-2), the UE is expected to apply the beam switching at a later slot $n_{switch}$ after slot n if the required gap (i.e. one symbol time gap) is configured by the gNB prior to $n_{switch}$. For example, if the required gap is configured on slot k (k>=n), then $n_{switch}$=k+1, i.e. the UE shall apply the new common beam for transmission of PUSCH and/or PUCCH transmissions from the first slot (i.e. slot k+1 or slot $n_{switch}$) after slot k in which the required gap is configured. From another point of view, $n_{switch}$ is determined by looking for the next sufficiently long gap (e.g. one symbol time gap).

In the third implementation (behavior 2-3), the UE is allowed to create a PUCCH or PUSCH transmission gap from the beginning of slot n (i.e. after completing transmission of PUCCH or PUSCH transmission by using the old beam), that is sufficiently long (e.g. at least one symbol) to accommodate the time duration for UL beam switching. This may imply to not transmit the first symbol of a PUCCH or PUSCH transmission by using the new beam in slot n. The first symbol of the PUCCH or PUSCH transmission in slot n is used for UL beam switching.

In the fourth implementation (behavior 2-4), the UE is allowed to create a PUCCH or PUSCH transmission gap before the end of slot n−1 that is sufficiently long (e.g. at least one symbol) to ensure that PUCCH and/or PUSCH transmissions can be transmitted by using the new common beam at the beginning of slot n (i.e. from the first symbol of slot n). This may imply to not transmit the last symbol of a PUCCH or PUSCH transmission by using the old beam in slot n−1. The last symbol of the PUCCH or PUSCH transmission in slot n−1 is used for UL beam switching.

In the fifth implementation (behavior 2-5), if there is no PUCCH transmission and/or PUSCH transmission scheduled to be transmitted in slot n, the UE can perform the UL beam switching in slot n, and apply the new common beam for transmission of PUSCH transmissions and PUCCH transmissions after slot n (e.g. from slot n+1).

(3) The new DL beam is a beam indicated in a TCI field of a DCI applied to reception of PDSCH transmissions scheduled by the DCI (referred to as "indicated beam" or "indicated new beam").

If a (new) beam for the PDSCH is indicated in a TCI field of a scheduling DCI, and may be applied to reception of PDSCH transmissions scheduled by the DCI after a time duration for the UE to determine the QCL information (which is reported by UE capability timeDurationForQCL), the UE behavior (i.e. when the indicated beam is applied) is discussed with reference to an example illustrated in FIG. 1.

As shown in FIG. 1, a DCI (DCI #1) in slot n schedules 4 PDSCH transmissions (i.e. PDSCH #1, PDSCH #2, PDSCH #3 and PDSCH #4) in slot n+2, n+3, n+4 and n+5, respectively. Each PDSCH transmission has a different scheduling offset (i.e. scheduling offset 1, scheduling offset 2, scheduling offset 3 and scheduling offset 4), as illustrated in FIG. 1. The TCI field contained in DCI #1 indicates a TCI state that indicates a (new) beam for all 4 PDSCH transmissions. The new beam indicated by the TCI state (i.e. "indicated beam") can be 20) applied after a time duration (e.g. timeDurationForQCL) from the reception of DCI #1.

It is obvious that, when a scheduling offset for a PDSCH transmission (e.g. scheduling offset 1 for PDSCH #1, and scheduling offset 2 for PDSCH #2) is less than the time duration (e.g. timeDurationfForQCL), the new beam indicated by the TCI state cannot apply to the PDSCH transmission (e.g. PDSCH #1 and PDSCH #2). A default beam, which is determined by the QCL parameter(s) used for PDCCH quasi co-location indication of the CORESET (which identifies a set of time-frequency resources for PDCCH transmission) associated with a monitored search space with the lowest controlResourceSetId in the latest slot in which one or more CORESETs within the active BWP of the serving cell are monitored by the UE, is used for reception of PDSCH #1 and PDSCH #2. Each serving cell consists of multiple BWPs. Each BWP may have different configurations on SCS and bandwidth.

On the other hand, when a scheduling offset for a PDSCH transmission (e.g. scheduling offset 3 for PDSCH #3, and scheduling offset 4 for PDSCH #4) is larger than the time duration (e.g. timeDurationfForQCL), the beam indicated by the TCI state should apply to the PDSCH transmission (e.g. PDSCH #3 and PDSCH #4). It means that the UE is required to switch its RX beam from the default beam to the beam indicated by the TCI state between reception of the last PDSCH transmission (i.e. PDSCH #2) by using the default beam and reception of the first PDSCH transmission (i.e. PDSCH #3) by using the indicated beam.

Considering different capabilities on DL beam switching reported by the UE (e.g. the time duration for DL beam switching, or whether the DL beam switching can be completed within the CP for the SCS of the serving cell), different UE behaviors (i.e. whether or when the indicated beam will apply to the PDSCH transmission with a scheduling offset larger than timeDurationfForQCL) are proposed.

The beam indicated by the TCI state of the TCI field contained in the scheduling DCI shall be applied from reception of the first scheduled PDSCH transmission (e.g. PDSCH #3 illustrated in FIG. 1) that has a scheduling offset larger than timeDurationfForQCL.

If the time duration for DL beam switching can be accommodated within the CP between contiguous PDSCH transmissions at the switching point (e.g. the reported $$T_{DL,i}^{Beam,}$$

(time duration for DL beam switching) is less than or equal to the CP corresponding to the SCS of the serving cell or the UE reported that the DL beam switching can be completed within the CP for the SCS of the serving cell), the UE will switch the DL beam from the default beam to the indicated beam from the first PDSCH transmission (e.g. PDSCH #3 in FIG. 1) that has a scheduling offset equal to or larger than the timeDurationfForQCL. The contiguous PDSCHs at the switching point refer to two PDSCH transmissions, the first of which (e.g. PDSCH #2 in FIG. 1) is received by using one beam (e.g. the default beam), and the second of which (e.g. PDSCH #3 in FIG. 1) is received by using another beam (e.g. the indicated new beam).

If the reported $$T_{DL,i}^{Beam,}$$

(time duration for DL beam switching) is larger than the CP corresponding to the SCS of the serving cell or the UE reported that the DL beam switching cannot be completed within the CP for the SCS of the serving cell, the UE expects that a time gap equal to or larger than the time duration for DL beam switching is reserved between reception of the last PDSCH transmission (e.g. PDSCH #2) by using the default beam and reception of the first PDSCH transmission (e.g. PDSCH #3) by using the indicated new beam, e.g., between the last symbol of reception of PDSCH #2 and the first symbol of reception of PDSCH #3. If the time gap equal to or larger than the time duration for DL beam switching is configured or indicated by the gNB, the UE will switch from the default beam to the indicated new beam (indicated in the TCI field of the DCI scheduling PDSCH transmissions) from the first PDSCH transmission (e.g. PDSCH #3 in FIG. 1) that has a scheduling offset equal to or larger than the timeDurationfForQCL.

If the time gap equal to or larger than the time duration for DL beam switching is not configured or indicated by the gNB, the UE may apply one of first, second, third, fourth and fifth implementations (behaviors 3-1 to 3-5), or alternatively be configured to apply one of the behaviors 3-1 to 3-5 as follows.

Behavior 3-1: if the time gap (that is equal to or larger than the time duration for DL beam switching) is not reserved, the UE uses the default beam for reception of all PDSCH transmissions. In other words, the UE does not switch to the indicated new beam. That is, PDSCH #3 and PDSCH #4 are also received by using the default beam.

Behavior 3-2: if the time gap (that is equal to or larger than the time duration for DL beam switching) is not reserved, the UE switches from the default beam to the indicated new beam at a later slot where there is a time gap equal to or larger than the time duration for DL beam switching before the later slot. For example, as shown in FIG. 1, there is a time gap between PDSCH #3 and PDSCH #4 that is enough for beam switching (i.e. that is equal to or larger than the time duration for DL beam switching), the UE switches from the default beam to the indicated new beam at the (first) slot in which PDSCH #4 is received. That is, the UE uses the default beam for reception of PDSCH #1, PDSCH #2 and PDSCH #3, and uses the indicated new beam for reception of PDSCH #4.

Behavior 3-3: if the time gap (that is equal to or larger than the time duration for DL beam switching) is not reserved, the UE starts to switch from the default beam to the indicated new beam from the end of PDSCH #2 (from the start of PDSCH #3). It means that the first M symbols of PDSCH #3 (the number of M depends on the time duration for DL beam switching) may not be received due to the time duration for DL beam switching. The first M symbols of PDSCH #3 are used for DL beam switching.

Behavior 3-4: if the time gap (that is equal to or larger than the time duration for DL beam switching) is not reserved, the UE stops reception of PDSCH #2 in the latest M symbols (the number of M depends on the beam switching time duration for DL reception) to start to switch from the default beam to the indicated new beam, in order to ensure that the beam switching can be completed before reception of PDSCH #3 (i.e. the UE receives PDSCH #3 by using the indicated new beam from the first symbol of PDSCH #3). The latest M symbols of PDSCH #2 are used for DL beam switching.

Behavior 3-5: if there is no PDSCH transmission scheduled to be received in slot n, the UE can perform the DL beam switching in slot n, and apply the new common beam for reception of PDSCH transmissions after slot n (e.g. from slot n+1).

Figure 2:
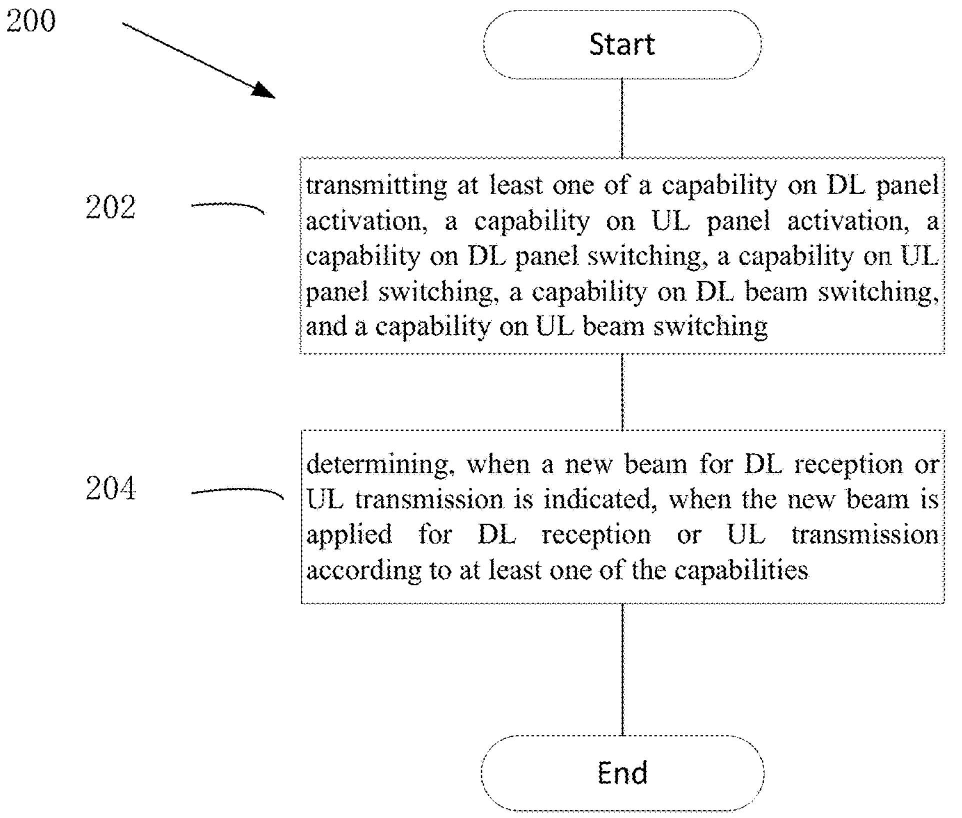
FIG. 2 is a schematic flow chart diagram illustrating an embodiment of a method.

FIG. 2 is a schematic flow chart diagram illustrating an embodiment of a method 200 according to the present application. In some embodiments, the method 200 is performed by an apparatus, such as a remote unit (UE). In certain embodiments, the method 200 may be performed by a processor executing program code, for example, a microcontroller, a microprocessor, a CPU, a GPU, an auxiliary processing unit, a FPGA, or the like.

The method 200 may comprise 202 transmitting at least one of a capability on DL panel activation, a capability on UL panel activation, a capability on DL panel switching, a capability on UL panel switching, a capability on DL beam switching, and a capability on UL beam switching; and 204 determining, when a new beam for DL reception or UL transmission is indicated, when the new beam is applied for DL reception or UL transmission according to at least one of the capabilities.

Each of the capabilities may be a time duration. The time duration may be transmitted as one of the number of OFDM symbols, the number of fractional OFDM symbols, the number of CPs, and the number of fractional CPs, for each SCS. If the RX panel used for reception of PDCCH transmissions and/or PDSCH transmissions is changed and shall be applied from slot n, the UE expects a time gap that is no less than the time duration for DL panel switching between the last symbol of reception of the latest PDCCH or PDSCH transmission before slot n and the first symbol of reception of PDCCH or PDSCH transmission in slot n, and if the TX panel used for transmission of PUSCH and/or PUCCH transmissions is changed and shall be applied form slot n, the UE expects a time gap that is no less than the time duration for UL panel switching between the last symbol of transmission of the latest PUSCH transmission or PUCCH transmission before slot n and the first symbol of transmission of PUSCH transmission or PUCCH transmission in slot n.

In some embodiment, the capability on DL beam switching may be a capability on whether DL beam switching can be completed within a CP for different SCSs; and the capability on UL beam switching may be a capability on whether UL beam switching can be completed within a CP for different SCSs.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is configured or indicated between the last symbol of reception of the latest PDCCH or PDSCH transmission before slot n and the first symbol of reception of PDCCH or PDSCH transmission in slot n or the capability on DL beam switching indicates that DL beam switching can be completed within a CP for the SCS, applying the changed DL beam from slot n.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is not configured or indicated between the last symbol of reception of the latest PDCCH or PDSCH transmission before slot n and the first symbol of reception of PDCCH or PDSCH transmission in slot n, or the capability on DL beam switching indicates that DL beam switching cannot be completed within a CP for the SCS, not applying the changed DL beam; or applying the changed DL beam from slot $n_{switch}$ that is later than slot n if the time gap that is no less than the time duration is configured prior to the slot $n_{switch}$; or applying the changed DL beam from reception of a first PDSCH or PDCCH transmission in slot n or after slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is configured or indicated between the last symbol of transmission of the latest PUCCH or PUSCH transmission before slot n and the first symbol of transmission of PDCCH or PDSCH transmission in slot n or the capability on UL beam switching indicates that UL beam switching can be completed within a CP for the SCS, applying the changed UL beam from slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is not configured or indicated between the last symbol of transmission of the latest PUCCH or PUSCH transmission before slot n and the first symbol of transmission of PUCCH or PUSCH transmission in slot n or the capability on UL beam switching indicates that UL beam switching cannot be completed within a CP for the SCS, not applying the changed UL beam; or applying the changed UL beam from slot $n_{switch}$ that is later than slot n if the time gap that is no less than the time duration for UL beam switching is configured prior to the slot $n_{switch}$, or applying the changed UL beam from transmission of a first PUSCH or PUCCH transmission in slot n or after slot n.

In some embodiment, the changed DL beam or the changed UL beam is a common beam.

In some other embodiment, the changed DL beam for reception of PDSCH transmission(s) is indicated in a TCI field of a DCI scheduling the PDSCH transmission(s). In particular, the slot n is a slot in which the first scheduled PDSCH transmission that has a scheduling offset larger than timeDurationForQCL is transmitted when multiple PDSCH transmissions are scheduled by the DCI.

Figure 3:
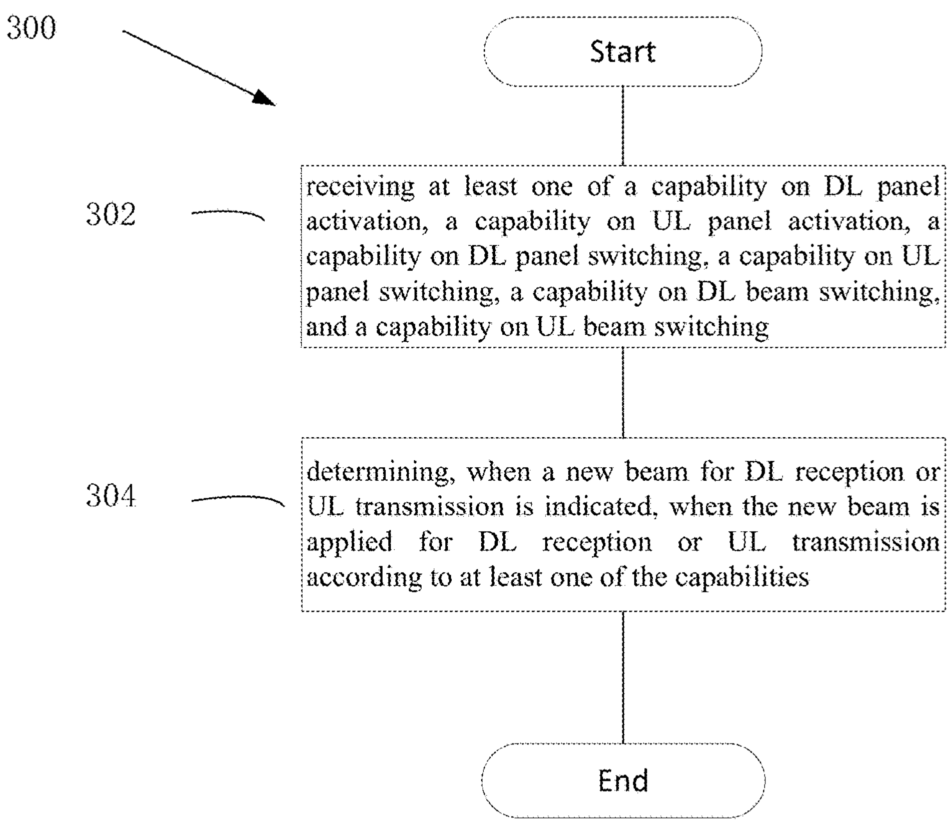
FIG. 3 is a schematic flow chart diagram illustrating a further embodiment of a method.

FIG. 3 is a schematic flow chart diagram illustrating a further embodiment of a method 300 according to the present application. In some embodiments, the method 300 is performed by an apparatus, such as a base unit. In certain embodiments, the method 300 may be performed by a processor executing program code, for example, a microcontroller, a microprocessor, a CPU, a GPU, an auxiliary processing unit, a FPGA, or the like.

The method 300 may comprise 302 receiving at least one of a capability on DL panel activation, a capability on UL panel activation, a capability on DL panel switching, a capability on UL panel switching, a capability on DL beam switching, and a capability on UL beam switching; and 304 determining, when a new beam for DL reception or UL transmission is indicated, when the new beam is applied for DL reception or UL transmission according to at least one of the capabilities.

Each of the capabilities may be a time duration. The time duration may be received as one of the number of OFDM symbols, the number of fractional OFDM symbols, the number of CPs, and the number of fractional CPs, for each SCS. If the RX panel used for reception of PDCCH transmissions and/or PDSCH transmissions is changed and shall be applied from slot n, the UE expects a time gap that is no less than the time duration for DL panel switching between the last symbol of reception of the latest PDCCH or PDSCH transmission before slot n and the first symbol of reception of PDCCH or PDSCH transmission in slot n, and if the TX panel used for transmission of PUSCH and/or PUCCH transmissions is changed and shall be applied form slot n, the UE expects a time gap that is no less than the time duration for UL panel switching between the last symbol of transmission of the latest PUSCH transmission or PUCCH transmission before slot n and the first symbol of transmission of PUSCH transmission or PUCCH transmission in slot n.

In some embodiment, the capability on DL beam switching may be a capability on whether DL beam switching can be completed within a CP for different SCSs; and the capability on UL beam switching may be a capability on whether UL beam switching can be completed within a CP for different SCSs.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is configured or indicated between the last symbol of reception of the latest PDCCH or PDSCH transmission before slot n and the first symbol of reception of PDCCH or PDSCH transmission in slot n or the capability on DL beam switching indicates that DL beam switching can be completed within a CP for the SCS, applying the changed DL beam from slot n.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is not configured or indicated between the last symbol of reception of the latest PDCCH or PDSCH transmission before slot n and the first symbol of reception of PDCCH or PDSCH transmission in slot n, or the capability on DL beam switching indicates that DL beam switching cannot be completed within a CP for the SCS, not applying the changed DL beam; or applying the changed DL beam from slot $n_{switch}$ that is later than slot n if the time gap that is no less than the time duration is configured prior to the slot $n_{switch}$; or applying the changed DL beam from reception of a first PDSCH or PDCCH transmission in slot n or after slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is configured or indicated between the last symbol of transmission of the latest PUCCH or PUSCH transmission before slot n and the first symbol of transmission of PDCCH or PDSCH transmission in slot n or the capability on UL beam switching indicates that UL beam switching can be completed within a CP for the SCS, applying the changed UL beam from slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is not configured or indicated between the last symbol of transmission of the latest PUCCH or PUSCH transmission before slot n and the first symbol of transmission of PUCCH or PUSCH transmission in slot n or the capability on UL beam switching indicates that UL beam switching cannot be completed within a CP for the SCS, not applying the changed UL beam; or applying the changed UL beam from slot $n_{switch}$ that is later than slot n if the time gap that is no less than the time duration for UL beam switching is configured prior to the slot $n_{switch}$; or applying the changed UL beam from transmission of a first PUSCH or PUCCH transmission in slot n or after slot n.

In some embodiment, the changed DL beam or the changed UL beam is a common beam.

In some other embodiment, the changed DL beam for reception of PDSCH transmission(s) is indicated in a TCI field of a DCI scheduling the PDSCH transmission(s). In particular, the slot n is a slot in which the first scheduled PDSCH transmission that has a scheduling offset larger than timeDurationForQCL is transmitted when multiple PDSCH transmissions are scheduled by the DCI.

Figure 4:
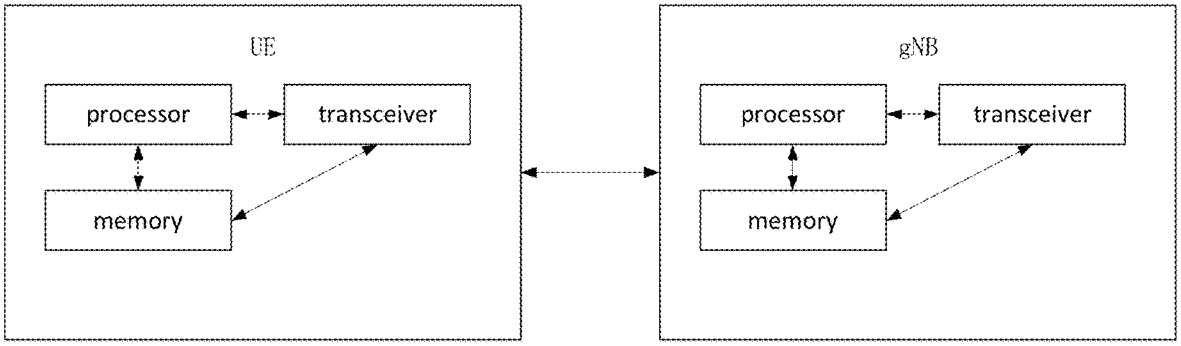
FIG. 4 is a schematic block diagram illustrating apparatuses according to one embodiment.

FIG. 4 is a schematic block diagram illustrating apparatuses according to one embodiment.

Referring to FIG. 4, the UE (i.e. the remote unit) includes a processor, a memory, and a transceiver. The processor implements a function, a process, and/or a method which are proposed in FIG. 2.

The UE comprises a transmitter that transmits at least one of a capability on DL panel activation, a capability on UL panel activation, a capability on DL panel switching, a capability on UL panel switching, a capability on DL beam switching, and a capability on UL beam switching; and a processor that determines, when a new beam for DL reception or UL transmission is indicated, when the new beam is applied for DL reception or UL transmission according to at least one of the capabilities.

Each of the capabilities may be a time duration. The time duration may be transmitted as one of the number of OFDM symbols, the number of fractional OFDM symbols, the number of CPs, and the number of fractional CPs, for each SCS. If the RX panel used for reception of PDCCH transmissions and/or PDSCH transmissions is changed and shall be applied from slot n, the UE expects a time gap that is no less than the time duration for DL panel switching between the last symbol of reception of the latest PDCCH or PDSCH transmission before slot n and the first symbol of reception of PDCCH or PDSCH transmission in slot n, and if the TX panel used for transmission of PUSCH and/or PUCCH transmissions is changed and shall be applied form slot n, the UE expects a time gap that is no less than the time duration for UL panel switching between the last symbol of transmission of the latest PUSCH transmission or PUCCH transmission before slot n and the first symbol of transmission of PUSCH transmission or PUCCH transmission in slot n.

In some embodiment, the capability on DL beam switching may be a capability on whether DL beam switching can be completed within a CP for different SCSs; and the capability on UL beam switching may be a capability on whether UL beam switching can be completed within a CP for different SCSs.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is configured or indicated between the last symbol of reception of the latest PDCCH or PDSCH transmission before slot n and the first symbol of reception of PDCCH or PDSCH transmission in slot n or the capability on DL beam switching indicates that DL beam switching can be completed within a CP for the SCS, applying the changed DL beam from slot n.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is not configured or indicated between the last symbol of reception of the latest PDCCH or PDSCH transmission before slot n and the first symbol of reception of PDCCH or PDSCH transmission in slot n, or the capability on DL beam switching indicates that DL beam switching cannot be completed within a CP for the SCS, not applying the changed DL beam; or applying the changed DL beam from slot $n_{switch}$ that is later than slot n if the time gap that is no less than the time duration is configured prior to the slot $n_{switch}$, or applying the changed DL beam from reception of a first PDSCH or PDCCH transmission in slot n or after slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is configured or indicated between the last symbol of transmission of the latest PUCCH or PUSCH transmission before slot n and the first symbol of transmission of PDCCH or PDSCH transmission in slot n or the capability on UL beam switching indicates that UL beam switching can be completed within a CP for the SCS, applying the changed UL beam from slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is not configured or indicated between the last symbol of transmission of the latest PUCCH or PUSCH transmission before slot n and the first symbol of transmission of PUCCH or PUSCH transmission in slot n or the capability on UL beam switching indicates that UL beam switching cannot be completed within a CP for the SCS, not applying the changed UL beam; or applying the changed UL beam from slot $n_{switch}$ that is later than slot n if the time gap that is no less than the time duration for UL beam switching is configured prior to the slot $n_{switch}$, or applying the changed UL beam from transmission of a first PUSCH or PUCCH transmission in slot n or after slot n.

In some embodiment, the changed DL beam or the changed UL beam is a common beam.

In some other embodiment, the changed DL beam for reception of PDSCH transmission(s) is indicated in a TCI field of a DCI scheduling the PDSCH transmission(s). In particular, the slot n is a slot in which the first scheduled PDSCH transmission that has a scheduling offset larger than timeDurationForQCL is transmitted when multiple PDSCH transmissions are scheduled by the DCI.

Referring to FIG. 4, the gNB (i.e. base unit) includes a processor, a memory, and a transceiver. The processors implement a function, a process, and/or a method which are proposed in FIG. 3.

The base unit comprises a receiver that receives at least one of a capability on DL panel activation, a capability on UL panel activation, a capability on DL panel switching, a capability on UL panel switching, a capability on DL beam switching, and a capability on UL beam switching; and a processor that determines, when a new beam for DL reception or UL transmission is indicated, when the new beam is applied for DL reception or UL transmission according to at least one of the capabilities.

Each of the capabilities may be a time duration. The time duration may be received as one of the number of OFDM symbols, the number of fractional OFDM symbols, the number of CPs, and the number of fractional CPs, for each SCS. If the RX panel used for reception of PDCCH transmissions and/or PDSCH transmissions is changed and shall be applied from slot n, the UE expects a time gap that is no less than the time duration for DL panel switching between the last symbol of reception of the latest PDCCH or PDSCH transmission before slot n and the first symbol of reception of PDCCH or PDSCH transmission in slot n, and if the TX panel used for transmission of PUSCH and/or PUCCH transmissions is changed and shall be applied form slot n, the UE expects a time gap that is no less than the time duration for UL panel switching between the last symbol of transmission of the latest PUSCH transmission or PUCCH transmission before slot n and the first symbol of transmission of PUSCH transmission or PUCCH transmission in slot n.

In some embodiment, the capability on DL beam switching may be a capability on whether DL beam switching can be completed within a CP for different SCSs; and the capability on UL beam switching may be a capability on whether UL beam switching can be completed within a CP for different SCSs.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is configured or indicated between the last symbol of reception of the latest PDCCH or PDSCH transmission before slot n and the first symbol of reception of PDCCH or PDSCH transmission in slot n or the capability on DL beam switching indicates that DL beam switching can be completed within a CP for the SCS, applying the changed DL beam from slot n.

If the DL beam used for reception of PDCCH transmissions and/or PDSCH transmissions is changed and shall be applied from slot n for a SCS of a serving cell, and if a time gap that is no less than a time duration indicated by the capability on DL beam switching for the SCS is not configured or indicated between the last symbol of reception of the latest PDCCH or PDSCH transmission before slot n and the first symbol of reception of PDCCH or PDSCH transmission in slot n, or the capability on DL beam switching indicates that DL beam switching cannot be completed within a CP for the SCS, not applying the changed DL beam; or applying the changed DL beam from slot $n_{switch}$ that is later than slot n if the time gap that is no less than the time duration is configured prior to the slot $n_{switch}$, or applying the changed DL beam from reception of a first PDSCH or PDCCH transmission in slot n or after slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is configured or indicated between the last symbol of transmission of the latest PUCCH or PUSCH transmission before slot n and the first symbol of transmission of PDCCH or PDSCH transmission in slot n or the capability on UL beam switching indicates that UL beam switching can be completed within a CP for the SCS, applying the changed UL beam from slot n.

If the UL beam used for transmission of PUCCH and/or PUSCH transmissions is changed and shall be applied from slot n for a SCS of a serving cell, and if a time gap that is no less than a time duration indicated by the capability on UL beam switching for the SCS is not configured or indicated between the last symbol of transmission of the latest PUCCH or PUSCH transmission before slot n and the first symbol of transmission of PUCCH or PUSCH transmission in slot n or the capability on UL beam switching indicates that UL beam switching cannot be completed within a CP for the SCS, not applying the changed UL beam; or applying the changed UL beam from slot $n_{switch}$ that is later than slot n if the time gap that is no less than the time duration for UL beam switching is configured prior to the slot $n_{switch}$; or applying the changed UL beam from transmission of a first PUSCH or PUCCH transmission in slot n or after slot n.

In some embodiment, the changed DL beam or the changed UL beam is a common beam.

In some other embodiment, the changed DL beam for reception of PDSCH transmission(s) is indicated in a TCI field of a DCI scheduling the PDSCH transmission(s). In particular, the slot n is a slot in which the first scheduled PDSCH transmission that has a scheduling offset larger than timeDurationForQCL is transmitted when multiple PDSCH transmissions are scheduled by the DCI.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

transmit at least one of a capability on downlink (DL) panel activation, a capability on uplink (UL) panel activation, a capability on DL panel switching, a capability on UL panel switching, a capability on DL beam switching, and a capability on UL beam switching; and determine, when a new beam for DL reception or UL transmission is indicated, when the new beam is applied for DL reception or UL transmission according to at least one of the capabilities, wherein, when the DL beam used for reception of PDCCH transmissions or PDSCH transmissions is changed and is to be applied from slot n for a sub-carrier spaces (SCS) of a serving cell, and when a time gap that is no less than a time duration indicated by the capability on DL beam switching for the SCS is configured or indicated between a last symbol of reception of a latest physical downlink control (PDCCH) or physical downlink shared channel (PDSCH) transmission before slot n and a first symbol of reception of PDCCH or PDSCH transmission in slot n or the capability on DL beam switching indicates that DL beam switching can be completed within a cyclic prefixes (CP) for the SCS, applying the changed DL beam from slot n.

2. The UE of claim 1, wherein, each of the capabilities is a time duration.

3. The UE of claim 2, wherein, the time duration is transmitted as one of a number of orthogonal frequency division multiplexing (OFDM) symbols, a number of fractional OFDM symbols, a number of cyclic prefixes (CPs), and a number of fractional CPs, for each sub-carrier space (SCS).

4. The UE of claim 1, wherein, the capability on DL beam switching is a capability on whether DL beam switching can be completed within a cyclic prefix (CP) for different sub-carrier spaces (SCSs); and the capability on UL beam switching is a capability on whether UL beam switching can be completed within a CP for different SCSs.

5. The UE of claim 2, wherein, if a receiver (RX) panel used for reception of physical downlink control channel (PDCCH) transmissions and/or physical downlink shared channel (PDSCH) transmissions is changed and is to be applied from slot n, the UE expects a time gap that is no less than a time duration for DL panel switching between a last symbol of reception of a latest PDCCH or PDSCH transmission before slot n and a first symbol of reception of PDCCH or PDSCH transmission in slot n, and if the transmitter (TX) panel used for transmission of physical uplink shared channel (PUSCH) and/or physical uplink control channel (PUCCH) transmissions is changed and is to be applied from slot n, the UE expects a time gap that is no less than a time duration for UL panel switching between a last symbol of transmission of alatest PUSCH transmission or PUCCH transmission before slot n and afirst symbol of transmission of PUSCH transmission or PUCCH transmission in slot n.

6. The UE of claim 1, wherein, if a DL beam used for reception of physical downline control channel (PDCCH) transmissions and/or physical downlink shared channel (PDSCH) transmissions is changed and is to be applied from slot n for a subcarrier space (SCS) of a serving cell, and if a time gap that is no less than a time duration indicated by the capability on DL beam switching for the SCS is not configured or indicated between a last symbol of reception of a latest PDCCH or PDSCH transmission before slot n and a first symbol of reception of PDCCH or PDSCH transmission in slot n, or the capability on DL beam switching indicates that DL beam switching cannot be completed within a cyclic prefix (CP) for the SCS, then the at least one processor is configured to cause the UE to:

not apply the changed DL beam; or apply the changed DL beam from slot nswitch that is later than slot n if the time gap that is no less than the time duration is configured prior to the slot nswitch, or apply the changed DL beam from reception of a first PDSCH or PDCCH transmission in slot n or after slot n.

7. The UE of claim 1, wherein, if the UL beam used for transmission of physical uplink control channel (PUCCH) and/or physical uplink shared channel (PUSCH) transmissions is changed and is to be applied from slot n for a sub-carrier space (SCS) of a serving cell, and if a time gap that is no less than a time duration indicated by the capability on UL beam switching for the SCS is configured or indicated between a last symbol of transmission of a latest PUCCH or PUSCH transmission before slot n and a first symbol of transmission of PDCCH or PDSCH transmission in slot n or the capability on UL beam switching indicates that UL beam switching can be completed within a cyclic prefix (CP) for the SCS, the at least one processor is configured to cause the UE to apply the changed UL beam from slot n.

8. The UE of claim 1, wherein, if the UL beam used for transmission of physical uplink control channel (PUCCH) and/or physical uplink shared channel (PUSCH) transmissions is changed and is to be applied from slot n for a sub-carrier space (SCS) of a serving cell, and if a time gap that is no less than a time duration indicated by the capability on UL beam switching for the SCS is not configured or indicated between a last symbol of transmission of a latest PUCCH or PUSCH transmission before slot n and a first symbol of transmission of PUCCH or PUSCH transmission in slot n or the capability on UL beam switching indicates that UL beam switching cannot be completed within a CP for the SCS, the at least one processor is configured to cause the UE to: not apply the changed UL beam; or apply the changed UL beam from slot $n_{switch}$ that is later than slot n if the time gap that is no less than the time duration for UL beam switching is configured prior to the slot $n_{switch}$, or apply the changed UL beam from transmission of a first PUSCH or PUCCH transmission in slot n or after slot n.

9. The UE of claim 1, wherein, the changed DL beam or the changed UL beam is a common beam.

10. The UE of claim 1, wherein, the changed DL beam for reception of PDSCH transmission(s) is indicated in a transmission configuration indicator (TCI) field of a downlink control information (DCI) scheduling the PDSCH transmission(s).

11. The UE of claim 10, wherein, the slot n is a slot in which afirst scheduled PDSCH transmission that has a scheduling offset larger than timeDurationForQCL is transmitted when multiple PDSCH transmissions are scheduled by the DCI.

12. A base unit, comprising:

at least one memory; and at least one processor coupled with the at least one memory and configured to cause the base unit to:

receive at least one of a capability on downlink (DL) panel activation, a capability on uplink (UL) panel activation, a capability on DL panel switching, a capability on UL panel switching, a capability on DL beam switching, and a capability on UL beam switching; and determining, when a new beam for DL reception or UL transmission is indicated, when the new beam is applied for DL reception or UL transmission according to at least one of the capabilities, wherein, when the DL beam used for reception of PDCCH transmissions or PDSCH transmissions is changed and is to be applied from slot n for a sub-carrier spaces (SCS) of a serving cell, and when a time gap that is no less than a time duration indicated by the capability on DL beam switching for the SCS is configured or indicated between a last symbol of reception of a latest physical downlink control (PDCCH) or physical downlink shared channel (PDSCH) transmission before slot n and a first symbol of reception of PDCCH or PDSCH transmission in slot n or the capability on DL beam switching indicates that DL beam switching can be completed within a cyclic prefixes (CP) for the SCS, applying the changed DL beam from slot n.

13. A processor for wireless communication, comprising:

at least one controller coupled with at least one memory and configured to cause the processor to:

transmit at least one of a capability on downlink (DL) panel activation, a capability on uplink (UL) panel activation, a capability on DL panel switching, a capability on UL panel switching, a capability on DL beam switching, and a capability on UL beam switching; and determine, when a new beam for DL reception or UL transmission is indicated, when the new beam is applied for DL reception or UL transmission according to at least one of the capabilities, wherein, when the DL beam used for reception of PDCCH transmissions or PDSCH transmissions is changed and is to be applied from slot n for a sub-carrier spaces (SCS) of a serving cell, and when a time gap that is no less than a time duration indicated by the capability on DL beam switching for the SCS is configured or indicated between a last symbol of reception of a latest physical downlink control (PDCCH) or physical downlink shared channel (PDSCH) transmission before slot n and a first symbol of reception of PDCCH or PDSCH transmission in slot n or the capability on DL beam switching indicates that DL beam switching can be completed within a cyclic prefixes (CP) for the SCS, applying the changed DL beam from slot n.

14. The processor of claim 13, wherein each of the capabilities is a time duration.

15. The processor of claim 14, wherein, the time duration is transmitted as one of a number of orthogonal frequency division multiplexing (OFDM) symbols, a number of fractional OFDM symbols, a number of cyclic prefixes (CPs), and a number of fractional CPs, for each sub-carrier space (SCS).

16. The processor of claim 14, wherein, the capability on DL beam switching is a capability on whether DL beam switching can be completed within a cyclic prefix (CP) for different sub-carrier spaces (SCSs); and the capability on UL beam switching is a capability on whether UL beam switching can be completed within a CP for different SCSs.

17. The processor of claim 14, wherein, if a receiver (RX) panel used for reception of physical downlink control channel (PDCCH) transmissions and/or physical downlink shared channel (PDSCH) transmissions is changed and is to be applied from slot n, the UE expects a time gap that is no less than a time duration for DL panel switching between a last symbol of reception of a latest PDCCH or PDSCH transmission before slot n and a first symbol of reception of PDCCH or PDSCH transmission in slot n, and if the transmitter (TX) panel used for transmission of physical uplink shared channel (PUSCH) and/or physical uplink control channel (PUCCH) transmissions is changed and is to be applied from slot n, the UE expects a time gap that is no less than a time duration for UL panel switching between a last symbol of transmission of a latest PUSCH transmission or PUCCH transmission before slot n and a first symbol of transmission of PUSCH transmission or PUCCH transmission in slot n.

18. A method performed by a user equipment (UE), the method comprising:

transmitting at least one of a capability on downlink (DL) panel activation, a capability on uplink (UL) panel activation, a capability on DL panel switching, a capability on UL panel switching, a capability on DL beam switching, and a capability on UL beam switching; and determining, when a new beam for DL reception or UL transmission is indicated, when the new beam is applied for DL reception or UL transmission according to at least one of the capabilities, wherein, when the DL beam used for reception of PDCCH transmissions or PDSCH transmissions is changed and is to be applied from slot n for a sub-carrier spaces (SCS) of a serving cell, and when a time gap that is no less than a time duration indicated by the capability on DL beam switching for the SCS is configured or indicated between a last symbol of reception of a latest physical downlink control (PDCCH) or physical downlink shared channel (PDSCH) transmission before slot n and a first symbol of reception of PDCCH or PDSCH transmission in slot n or the capability on DL beam switching indicates that DL beam switching can be completed within a cyclic prefixes (CP) for the SCS, applying the changed DL beam from slot n.

19. The method of claim 18, wherein each of the capabilities is a time duration.

* * * * *